(12) United States Patent
Gunji et al.

(10) Patent No.: US 7,927,751 B2
(45) Date of Patent: Apr. 19, 2011

(54) FUEL CELL POWER SYSTEM

(75) Inventors: Akira Gunji, Hitachinaka (JP); Hiromi Tokoi, Tokai (JP); Shin Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 956 days.

(21) Appl. No.: 11/527,479

(22) Filed: Sep. 27, 2006

(65) Prior Publication Data

US 2007/0178334 A1    Aug. 2, 2007

(30) Foreign Application Priority Data

Jan. 30, 2006   (JP) ................... 2006-020491

(51) Int. Cl.
*H01M 8/04* (2006.01)
(52) U.S. Cl. .................. 429/443; 429/433; 429/444
(58) Field of Classification Search .......... 429/17
See application file for complete search history.

(56) References Cited

U.S. PATENT DOCUMENTS 6,866,951 B2 * 3/2005 Foley et al. ............... 429/17

FOREIGN PATENT DOCUMENTS

| JP | 08-203552 | | 8/1996 |
|---|---|---|---|
| JP | 2002-056858 | | 2/2002 |
| JP | 2004-247268 | * | 9/2004 |
| JP | 2005-129513 | | 5/2005 |

* cited by examiner

*Primary Examiner* — Ula C Ruddock
*Assistant Examiner* — Jacob Marks
(74) *Attorney, Agent, or Firm* — Antonelli, Terry, Stout & Kraus, LLP.

(57) ABSTRACT

The present invention provides a fuel cell power system and a power generating method in which the rise of concentration of water vapor and carbon dioxide in the direction of the anode gas flow is controlled to enhance the electromotive force in the downstream region of the anode gas flow, thereby improving the power generating efficiency. A mixed gas of a hydrocarbon and water vapor and/or carbon dioxide or a reformed version of said mixed gas having an oxygen atom/carbon atom ratio (O/C ratio) of 2 or higher is supplied from a spot upstream in the direction of the anode gas flow while a hydrocarbon or a mixed gas of a hydrocarbon and water vapor and/or carbon dioxide having an O/C ratio of lower than 2 is supplied supplementally from a spot downstream, and the gas supplied supplementally from the downstream side is reformed by making use of water vapor and carbon dioxide generated by the electrochemical reactions upstream of the anode gas flow and is utilized for power generation.

10 Claims, 5 Drawing Sheets

FUEL CELL POWER SYSTEM

FIELD OF THE INVENTION

The present invention relates to a fuel cell power system and a power generating method, more particularly to a power system comprising the solid oxide fuel cells and a power generating method using such a power system.

BACKGROUND OF THE INVENTION

Fuel cell is an electric power generating device having an anode (fuel electrode) positioned on one side and a cathode (air electrode) on the other side with an electrolyte interposed between them, in which fuel in an anode gas flowing on the anode surface and an oxidizer in a cathode gas flowing on the cathode surface are electrochemically reacted with the aid of the electrolyte (cell reaction) to generate electricity. Solid oxide fuel cell is a type of fuel cell using an oxygen ion conducting solid electrolyte, and as it is operated at a high temperature of 700 to 1,000° C., it has an advantage of being capable of conducting a hydrocarbon reforming reaction using the anode as a catalyst. The electrochemical reaction that occurs at the cathode of the solid oxide fuel cell is expressed by the formula (1) shown below, and the electrochemical reactions taking place at the anode are expressed by the formulae (2) and (3). The hydrocarbon reforming reactions are also expressed by the formulae (4) and (5).

$$O_2 + 4e^- \rightarrow 2O^{2-} \quad (1)$$

$$H_2 + O^{2-} \rightarrow H_2O + 2e^- \quad (2)$$

$$CO + O^{2-} \rightarrow CO_2 + 2e^- \quad (3)$$

$$C_nH_{2m} + nH_2O \rightarrow nCO + (n+m)H_2 \quad (4)$$

$$C_nH_{2m} + nCO_2 \rightarrow 2nCO + mH_2 \quad (5)$$

Hydrocarbons, when heated to a high temperature of 500° C. or above, are cracked to cause carbon deposition. When such carbon deposition occurs on the anode, electrode performance deteriorates. In order to prevent such carbon deposition, water vapor and/or carbon dioxide are added so that the ratio of oxygen atom to carbon atom (hereinafter referred to as O/C ratio) in the anode gas will be kept at 2 or above. As seen from the formulae (4) and (5), addition of water vapor and/or carbon dioxide to the hydrocarbon is necessary for its reforming, too.

The electromotive force of the solid oxide fuel cells is decided by the ratio of the partial pressure of oxygen in the cathode gas to the partial pressure of oxygen in the anode gas. The oxygen concentration in the anode gas is decided by the chemical equilibrium expressed by the following formulae (6)-(8):

$$2H_2 + O_2 \leftrightarrow 2H_2O \quad (6)$$

$$2CO + O_2 \leftrightarrow 2CO_2 \quad (7)$$

$$C_nH_{2m} + (n+m/2)O_2 \leftrightarrow nCO_2 + mH_2O \quad (8)$$

The electromotive force attenuates when the ratio of the concentration of fuel such as hydrogen, carbon monoxide and hydrocarbon to the concentration of water vapor and/or carbon dioxide lowers. Therefore, supply of fuel in admixture with water vapor and/or carbon dioxide leads to a reduction of electromotive force. It is thus desirable, in terms of enhancement of electromotive force, to minimize incorporation of water vapor and carbon dioxide in the fuel.

In the solid oxide fuel cells, the anode gas flows from the inlet toward the outlet, and as it passes along the anode surface, the fuel concentration in the anode gas decreases due to the electrochemical reactions between the fuel and the oxidizer while the concentration of water vapor and/or carbon dioxide increases. Because of this compositional distribution of the anode gas, the electromotive force lessens in accordance with the flow of the anode gas from the inlet toward the outlet. Consequently, the current density falls down at the electrode near the anode gas outlet where the electromotive force is low, and the current is concentrated at the electrode near the anode gas inlet where the electromotive force is high. Voltage drop caused by this concentration of current density has been blamed for the fall of power generating efficiency of the cells. As a means for curving the decrease of fuel concentration in the anode gas, it has been known to uniformly distribute the fuel of the same composition in the whole area of the anode, as for instance disclosed in Patent Document 1.
Patent Document 1: JP-A-8-203552

BRIEF SUMMARY OF THE INVENTION

Even if the fuel of the same composition is uniformly distributed in the whole area of the anode, the concentration of water vapor and/or carbon dioxide elevates as the anode gas proceeds from its inlet toward the outlet because of formation of water vapor and/or carbon dioxide by the electrochemical reactions. Therefore, the fuel distributed to the whole region of the anode is mixed with the anode gas increased in concentration of water vapor and/or carbon dioxide and is supplied to the anode with the fuel concentration reduced, causing attenuation of electromotive force. If the composition of the supplied anode gas is same and the utilization of the fuel in the electrochemical reactions is also same, then the anode gas composition at the outlet is same and the electromotive force near the anode gas outlet remains unchanged. The electromotive force distribution is therefore loosened, but the desired effect of enhancing power generating efficiency can not be obtained.

The present invention is designed to provide a fuel cell power system which is capable of raising the electromotive force in the downstream region of the anode gas and enhancing power generating efficiency by controlling the rise of concentration of water vapor and carbon dioxide in the anode gas flow direction, and a power generating method using such a power system.

More particularly, the present invention provides a fuel cell power system using a hydrocarbon or a reformed hydrocarbon gas as fuel, said power system comprising the fuel cells each having an anode positioned on one side and a cathode on the other side with an electrolyte disposed between them, in which two types of anode gases differing in the oxygen atom/carbon atom ratio (O/C ratio) is supplied to said anode, with the gas with a higher O/C ratio being supplied from the upstream side in the direction of the anode gas flow and the gas with a lower O/C ratio being supplied from the downstream side.

The present invention also provides a fuel cell power generating method according to which electric power is generated by supplying an anode gas containing a hydrocarbon or a reformed hydrocarbon gas and a cathode gas composed of air to each fuel cell having an anode and a cathode with the interposition of an electrolyte between them, in which a gas with a higher O/C ratio is flown from the upstream side in the direction of said anode gas flow while a gas with a lower O/C ratio is flown from the downstream side, and the gas with a lower O/C ratio supplied from the downstream side is reformed by making use of water vapor and carbon dioxide generated by the electrochemical reactions in the upstream region in the direction of the anode gas flow and is utilized as fuel for power generation.

The present invention further provides a fuel cell power system comprising fuel cells each having an anode and a cathode with an electrolyte interposed between them, and designed to generate electric power by supplying an anode gas containing a hydrocarbon or a reformed hydrocarbon gas and a cathode gas composed of air, in which there are provided the anode gas supply channels designed to supply the anode gas from at least two spots, upstream side and downstream side in the direction of said anode gas flow, with the anode gas with a higher O/C ratio being supplied from the upstream side and the anode gas with a lower O/C ratio being supplied from the downstream side, and a means for preventing rise of gas temperature is provided in the gas supply channel through which the anode gas with a lower O/C ratio is supplied.

In the present invention, a mixed gas of a hydrocarbon and water vapor and/or carbon dioxide with an O/C ratio of 2 or higher, or a reformed version of this mixed gas (these gases being hereinafter referred to collectively as high o/c ratio gas) is supplied from the topmost upstream portion of the anode gas flow. Also, a mixed gas of a hydrocarbon and water vapor and/or carbon dioxide with an O/C ratio of lower than 2 (this gas being hereinafter referred to as low O/C ratio gas) is supplementally supplied at a halfway point of the anode gas flow. The low O/C ratio gas supplementally fed from the halfway point of the anode gas flow is reformed by making use of water vapor and/or carbon dioxide generated by the electrochemical reactions occurring upstream in the direction of the anode gas flow and is utilized for power generation.

Other objects, features and advantages of the invention will become apparent from the following description of the embodiments of the invention taken in conjunction with the accompanying drawings.

DESCRIPTION OF REFERENCE NUMERALS

1: solid electrolyte, 2: cathode, 3: anode, 4: fuel cell, 11: air inlet pipe, 12: fuel distributing tube, 13: fuel jet, 14: exhaust port, 21: module container, 22: combustion chamber, 23: bottom partition, 24: top partition, 25: water atomizer, 26: insulator, 27: electrical connector, 31: air, 32: methane/water vapor mixed gas, 33: methane gas.

DETAILED DESCRIPTION OF THE INVENTION

The solid oxide fuel cells can be roughly divided shape-wise into cylindrical (tubular type) and flat plate types, but the present invention can be applied to both of these types. In the following description, the present invention is explained with particular reference to the cylindrical, especially bag tube type fuel cells.

EXAMPLE 1

Figure 1:
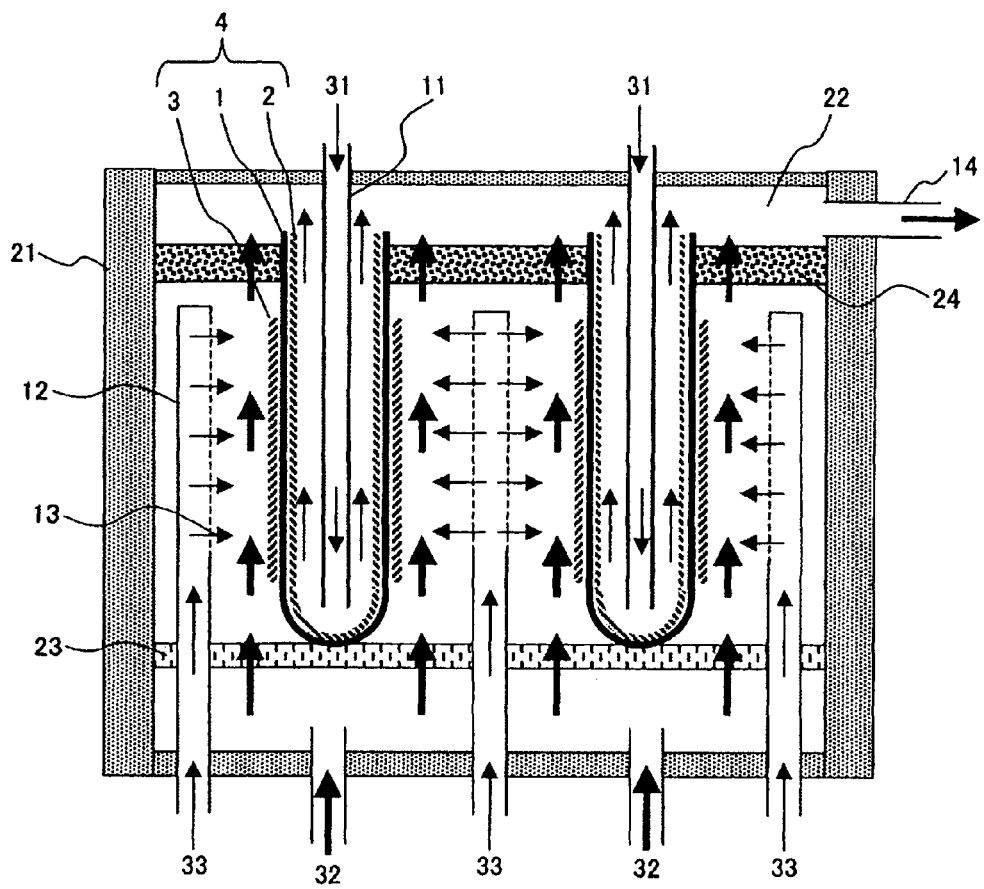
FIG. 1 is a lateral sectional view showing the makeup of the fuel cell power system in an embodiment of the present invention.

A schematic illustration of a power system comprising the bag tube type solid oxide fuel cells is given in FIG. 1. Each of the fuel cells 4 shown in FIG. 1 has a cathode 2 disposed on the inner surface of a bag tube type solid electrolyte 1 and an anode 3 disposed on its outer surface. The present invention can be applied equally where the cathode and the anode are changed in their positions. The fuel cells 4 are housed a module container 21. This module container 21 is designed to serve as a gas seal. The cathode gas, or air 31, is supplied to the bottom portion of each fuel cell 4 from an air inlet pipe 11, reverses its course at the bottom of the fuel cell 4 to flow back upwardly in the inside of the cell, inducing an electrochemical reaction in the cathode, and then passes into a space called combustion chamber 22.

A methane/water vapor mixed gas with an O/C ratio of 2 or higher, which functions as an anode gas, is supplied to the lower portion of each fuel cell through a bottom partition 23, then flows upwardly along the anode surface with its composition being varied by the electrochemical and reforming reactions in the anode, then passes into a combustion chamber 22 through a top partition 24 to become mixed with the cathode gas, and after combustion of the residual fuel and air, is discharged out of the system from an exhaust port 14. Methane in the methane/water vapor mixed gas 32 used in this example may be substituted by other hydrocarbons. Also, water vapor may be replaced with carbon dioxide. It is also possible to use reformed versions of such mixed gases.

As the anode gas, in addition to a methane/water vapor mixed gas 32, methane gas 33 is supplied from the fuel jets 13 provided in the fuel distributing pipes 12, and mixed in the anode gas after the electrochemical reaction using the methane/water vapor mixed gas 32 as fuel. The jet flow rate of methane gas 33 is set so that the O/C ratio of the anode gas after mixed with methane gas 33 will not become lower than 2. Setting of the jet flow rate of methane gas 33 can be made by properly selecting the diameter and distribution of the fuel jets 13 and the pressure of methane gas 33. Methane gas 33 may be substituted by other hydrocarbons. The anode gas may contain water vapor and/or carbon dioxide within limits not reducing the O/C ratio below 2. It may also contain hydrogen and carbon monoxide.

Methane gas 33 can not be reformed per se and can not be utilized directly for the electrochemical reactions. However, since the anode gas contains water vapor and/or carbon dioxide formed by the electrochemical reactions using the methane/water vapor mixed gas 32 as fuel, the methane gas 33 after mixed in the anode gas is reformed into hydrogen or carbon monoxide by dint of such water vapor or carbon dioxide and utilized for the electrochemical reactions.

Figure 2:
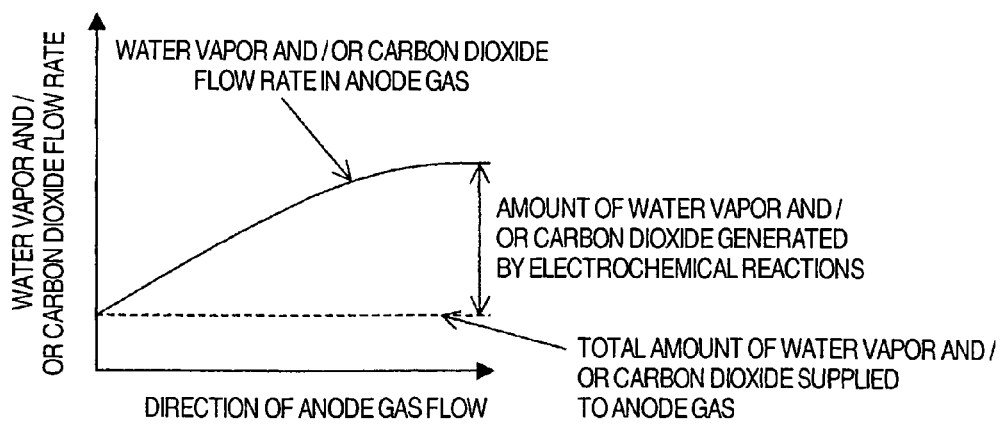
FIG. 2 is a graphic illustration of the water vapor and/or carbon dioxide flow rate in the direction of the anode gas flow in the instant embodiment of the present invention.
Figure 3:
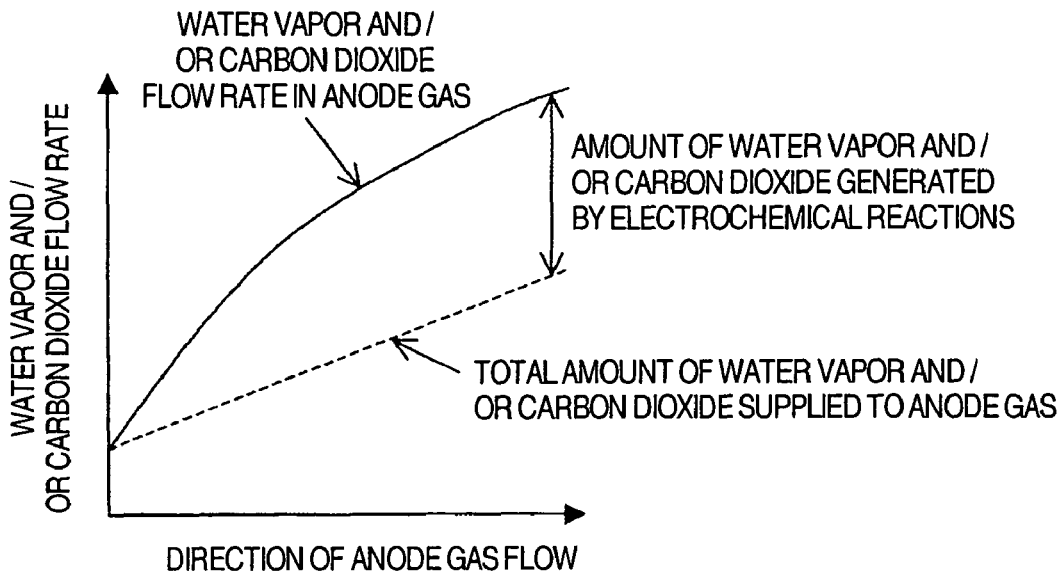
FIG. 3 is a graphic illustration of the water vapor and/or carbon dioxide flow rate in the direction of the anode gas flow in the prior art.

The water vapor and/or carbon dioxide flow rate in the direction of the anode gas flow in the instant embodiment of this invention is shown in FIG. 2, and the water vapor and/or carbon dioxide flow rate in the direction of the anode gas flow in a conventional system in which a gas of the same composition as the methane/water vapor mixed gas 32 is supplied from the fuel distributing pipes 12, too, is shown in FIG. 3.

Figure 4:
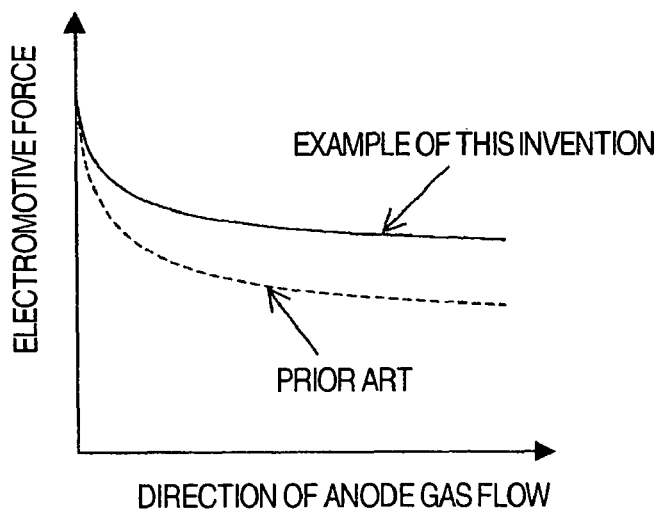
FIG. 4 is a graph showing the electromotive force in the direction of the anode gas flow.

FIG. 4 shows the electromotive force in the direction of the anode gas flow. In the instant embodiment of the present invention, since methane gas 33 free of water vapor and carbon dioxide is supplied as anode gas from the fuel distributing pipes 12, the amount of water vapor and/or carbon dioxide supplied as anode gas is small as compared with the instance where, as in the conventional system, a gas of the same composition as the methane/water vapor mixed gas with an O/C ratio of 2 or higher supplied through the bottom partition, which is the starting point of the anode gas flow, is supplied from the fuel distributing pipes. Consequently, the rise of water vapor and/or carbon dioxide concentration in the downstream region of the anode gas flow is inhibited, resulting in an enhanced electromotive force in the anode gas downstream region and improved performance of the system. Further, since methane gas 33 is supplemented to keep the O/C ratio of the anode gas at 2 or higher, there takes place no carbon deposition even in the anode gas which becomes heated to the same level of high temperature, 700 to 1,000° C., as the fuel cell temperature.

EXAMPLE 2

Figure 5:
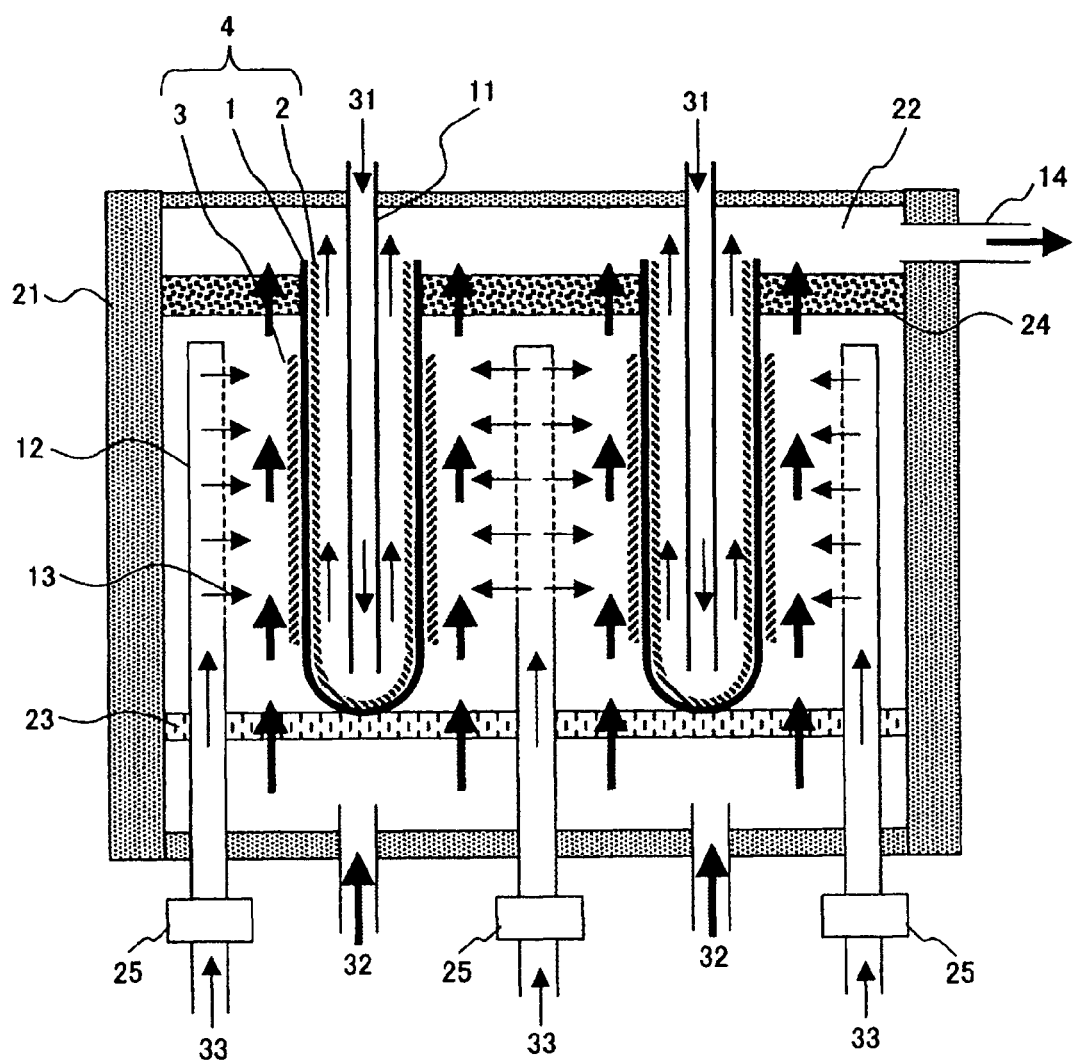
FIG. 5 is a lateral sectional view illustrating another embodiment of the present invention.

A modification of Example 1 is shown in FIG. 5. Methane gas 44 in the fuel distribution pipes 12 may be heated to 500° C. or higher by heat transfer from the fuel cells 4, provoking a possibility of causing carbon deposition. When carbon deposition takes place in the fuel distributing pipes 12, the fuel distributing channels may be blocked, so that it needs to control the temperature of methane gas in the fuel distribution pipes to stay 500° C. or less.

In this embodiment of the invention, atomized water with an O/C ratio of lower than 2 is sprayed to methane gas 33 by an atomized water spray means 25 to control the rise of temperature of methane gas 33 by latent heat of evaporation of the atomized water.

In another modification, the fuel distribution pipes may be designed to have a dual structure, with methane gas 33 being flown in the inside passage while a cooling gas flown in the outside passage to thereby control the rise of temperature of methane gas 33.

EXAMPLE 3

Figure 6:
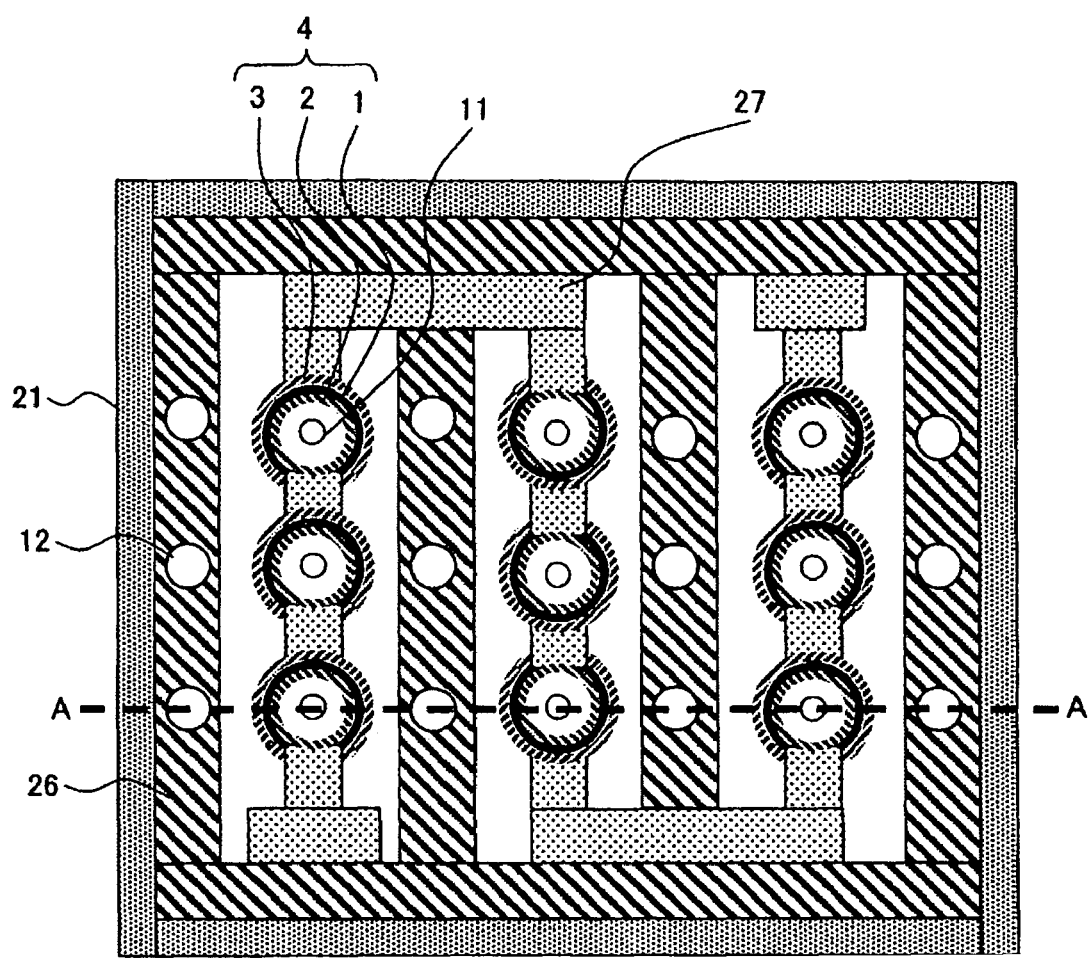
FIG. 6 is a plan sectional view of still another embodiment of the present invention.
Figure 7:
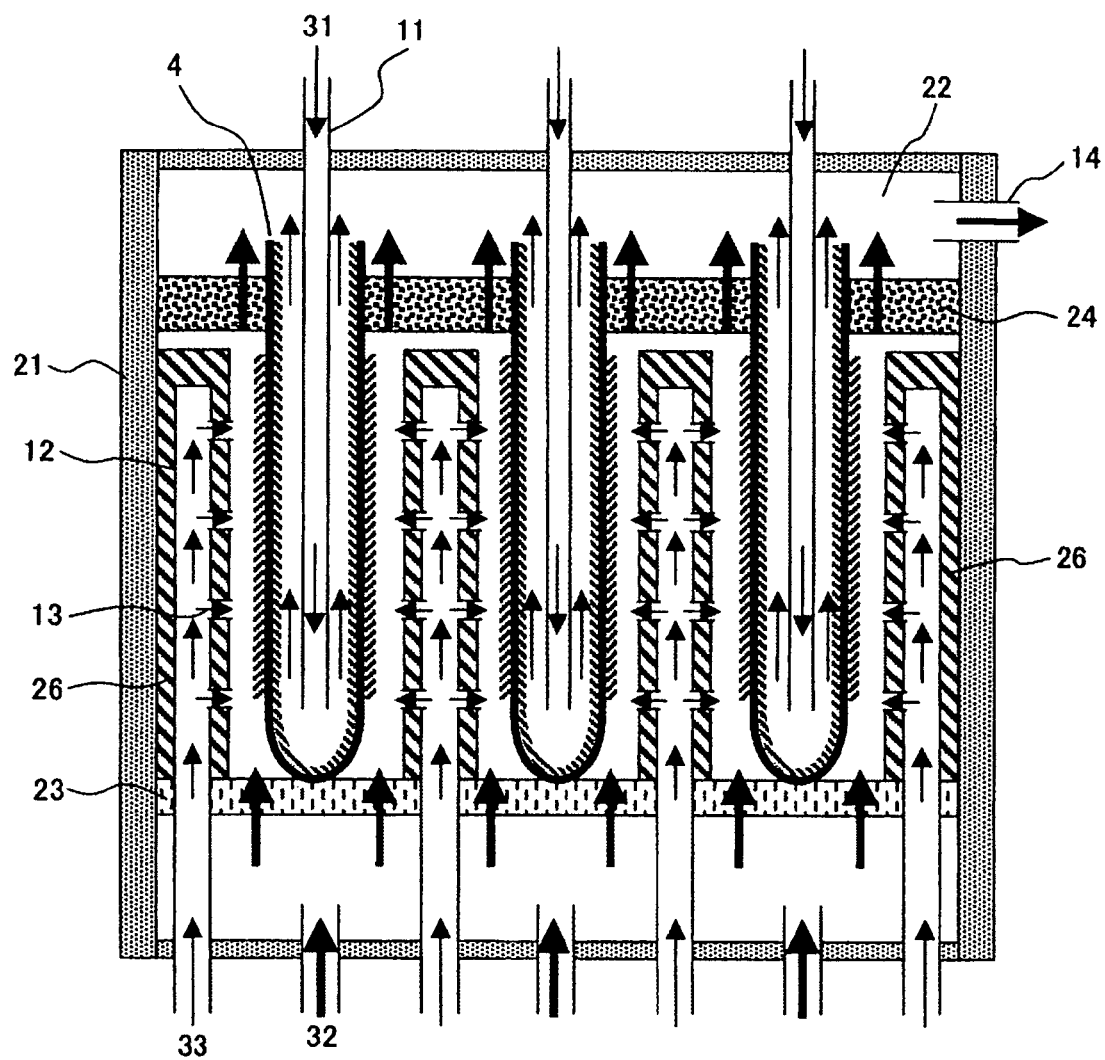
FIG. 7 is a lateral sectional view taken along the line A-A of FIG. 6.

A plan sectional view of a fuel cell power system comprising an assemblage of a plurality of fuel cells 4 is shown in FIG. 6 as another modification of Example 1. FIG. 7 is a side sectional view taken along the line A-A of FIG. 6.

Since one fuel cell can produce only a small voltage of about 1 V, usually a large number of cells are used by electrically connecting them in series by electrical connectors 27 to obtain a high output voltage. In case the fuel cells 4 electrically connected in series are disposed adjacent to each other, an insulator 26 is interposed between the adjoining cells since the anodes 3 on the outer surfaces of the respective fuel cells 4 differ from each other in electric potential. Insulators 26 are also used for securing insulation between the anodes and the module container 21, insulation between the electrical connectors 27 and the module container 21, and insulation between the electrical connectors 27 differing from each other in electric potential.

In this example, a fuel distributing pipe 12 is disposed in the inside of each insulator 26. Fuel jets 13 are provided in each insulator 26, too, for supplying methane gas 33 from the fuel distributing pipe 12 to the fuel cell 4. Since the fuel distributing pipes 12 are disposed in the inside of the insulators 26, it is possible to install the fuel distributing pipes 12 without increasing the inner volume of the module container 21. In the case of this structure, it is preferable to use a material with low heat conductivity for the insulators 26. Use of the insulators 26 with low heat conductivity makes it possible to control the rise of temperature of methane gas 33 in the fuel distributing pipes 12.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

According to the present invention, since the low O/C ratio gas supplied supplementally at a point halfway of the anode gas flow is low in concentration of water vapor and carbon dioxide, it is possible to control the rise of concentration of water vapor and carbon dioxide generated in the direction of the anode gas flow. This makes it possible to raise the electromotive force in the region downstream in the direction of the anode gas flow to enhance power generating efficiency.

The invention claimed is:

1. A fuel cell power system comprising:
fuel cells each composed of single fuel cells having an anode positioned on one side and a cathode on the other side, with an electrolyte being interposed between the anode and the cathode,
in which a hydrocarbon or a reformed hydrocarbon gas is used as fuel,
a gas with a higher oxygen atom/carbon atom ratio (O/C ratio) is supplied to an upstream side of said anode of each of said fuel cells in the direction of the anode gas flow, and
a gas with a lower O/C ratio is supplied to a downstream side of said anode of each of said fuel cells,
wherein two types of anode gases differing in O/C ratio from each other are supplied to the anode of each of said single fuel cells.

2. The fuel cell power system according to claim 1 wherein the anode gas with a lower O/C ratio is supplied from plural spots along the direction of the anode gas flow to said anode of each of said fuel cells.

3. The fuel cell power system according to claim 1 wherein the O/C ratio in the anode gas supplied from the upstream side is 2 or higher.

4. The fuel cell power system according to claim 1 wherein the O/C ratio in the anode gas supplied from the downstream side is lower than 2.

5. The fuel cell power system according to claim 1 wherein the O/C ratio in the anode gas supplied from the upstream side is 2 or higher and the O/C ratio in the anode gas supplied from the downstream side is lower than 2.

6. The fuel cell power system according to claim 1 wherein the anode gas with a higher O/C ratio comprises a mixture of a hydrocarbon with water vapor and/or carbon dioxide.

7. The fuel cell power system according to claim 1 wherein the anode gas with a lower O/C ratio comprises a hydrocarbon or a mixture of a hydrocarbon with water vapor and/or carbon dioxide.

8. A fuel cell power system comprising:
fuel cells each composed of single fuel cells having an anode and a cathode with an electrolyte interposed between the anode and interposed between the anode and the cathode, which is designed to generate electric power by supplying an anode gas containing a hydrocarbon or a reformed hydrocarbon gas and a cathode gas composed of air, in which there are provided anode gas supply channels designed to supply an anode gas flow to said anode of each of said fuel cells from at least two spots on an upstream side of said anode of each of said fuel cells and a downstream side of said anode of each of said fuel cells in the direction of said anode gas flow, an anode gas with a higher oxygen atom/carbon atom ratio (O/C ratio) is supplied to the upstream side and an anode gas with a lower O/C ratio is supplied to the downstream side, wherein two types of anode gasses differing in O/C ratio from each other are supplied to the anode of said single fuel cells, and there is provided a means for preventing a rise in gas temperature in a gas supply channel through which the anode gas with a lower O/C ratio is supplied.

9. The fuel cell power system according to claim 8 wherein the O/C ratio in the anode gas with a higher O/C ratio is 2 or higher, and the O/C ratio in the anode gas with a lower O/C ratio is lower than 2.

10. The fuel cell power system according to claim 9 wherein a gas, to which atomized water has been sprayed with the O/C ratio kept below 2, is used as the anode gas with an O/C ratio of lower than 2.

* * * * *